(12) United States Patent
Matsumoto et al.

(10) Patent No.: US 10,003,085 B2
(45) Date of Patent: Jun. 19, 2018

(54) CARBON SUPPORT MATERIAL FOR SOLID POLYMER TYPE FUEL CELL USE AND METAL CATALYST PARTICLE-SUPPORTING CARBON MATERIAL AND METHODS OF PRODUCTION OF SAME

(71) Applicants: NIPPON STEEL & SUMITOMO METAL CORPORATION, Tokyo (JP); NIPPON STEEL & SUMIKIN CHEMICAL CO., LTD., Tokyo (JP)

(72) Inventors: Katsumasa Matsumoto, Tokyo (JP); Takashi Iijima, Tokyo (JP); Masataka Hiyoshi, Tokyo (JP); Hiroyuki Hayashida, Kitakyushu (JP); Kazuhiko Mizuuchi, Kitakyushu (JP); Takumi Kouno, Kitakyushu (JP); Masakazu Higuchi, Kitakyushu (JP); Masakazu Katayama, Kitakyushu (JP)

(73) Assignees: NIPPON STEEL & SUMITOMO METAL CORPORATION, Tokyo (JP); NIPPON STEEL & SUMIKIN CHEMICAL CO., LTD., Tokyo (JP)

( * ) Notice: Subject to any disclaimer, the term of this patent is extended or adjusted under 35 U.S.C. 154(b) by 230 days.

(21) Appl. No.: 15/103,649

(22) PCT Filed: Dec. 12, 2014

(86) PCT No.: PCT/JP2014/083043
§ 371 (c)(1),
(2) Date: Jun. 10, 2016

(87) PCT Pub. No.: WO2015/088025
PCT Pub. Date: Jun. 18, 2015

(65) Prior Publication Data
US 2016/0329571 A1    Nov. 10, 2016

(30) Foreign Application Priority Data

Dec. 13, 2013    (JP) .............................. 2013-257777

(51) Int. Cl.
*H01M 4/92*    (2006.01)
*B01J 31/28*    (2006.01)
(Continued)

(52) U.S. Cl.
CPC ............. *H01M 4/926* (2013.01); *B01J 31/28* (2013.01); *H01M 4/8605* (2013.01); *H01M 4/9083* (2013.01); *H01M 2008/1095* (2013.01)

(58) Field of Classification Search
CPC .......................... H01M 4/9083; H01M 4/926
(Continued)

(56) References Cited

U.S. PATENT DOCUMENTS 6,689,505 B1    2/2004  Albers et al.
2011/0058308 A1*  3/2011  Nishi ............... B82Y 30/00
                                                    361/503

FOREIGN PATENT DOCUMENTS

CA    2750783 A1    6/2010
CA    2805736 A1    1/2012
(Continued)

OTHER PUBLICATIONS

International Search Report for PCT/JP2014/083043 dated Mar. 17, 2015.
(Continued)

*Primary Examiner* — Basia Ridley
*Assistant Examiner* — James Erwin
(74) *Attorney, Agent, or Firm* — Birch, Stewart, Kolasch & Birch, LLP

(57) ABSTRACT

Provided are a supporting carbon material for a solid polymer fuel cell and a metal-catalyst-particle-supporting carbon
(Continued)

material that, when used as a carrier for a solid polymer fuel cell catalyst, have excellent power generation performance in high-humidity conditions, which are conditions in which solid polymer fuel cells are operated. A supporting carbon material for a solid polymer fuel cell and a metal-catalyst-particle-supporting carbon material characterized in being a porous carbon material, the hydrogen content being 0.004-0.010% by mass, the nitrogen adsorption BET specific surface area being 600 m$^2$/g-1500 m$^2$/g, and the relative intensity ratio ($I_D/I_G$) between the peak intensity ($I_D$) in the range of 1200-1400 cm$^{-1}$ known as the D-band and the peak intensity ($I_G$) in the range of 1500-1700 cm$^{-1}$ known as the G-band, obtained from the Raman spectrum, being 1.0-2.0.

13 Claims, 3 Drawing Sheets

(51) Int. Cl.
    *H01M 4/86*     (2006.01)
    *H01M 4/90*     (2006.01)
    *H01M 8/1018*     (2016.01)

(58) Field of Classification Search
    USPC .......................................................... 429/524
    See application file for complete search history.

(56) References Cited

FOREIGN PATENT DOCUMENTS

| | | |
|---|---|---|
| EP | 2001-85020 A | 3/2001 |
| EP | 1 643 573 A1 | 4/2006 |
| EP | 2 511 008 A1 | 10/2012 |
| JP | 2006-8472 A | 1/2006 |
| JP | 2006-216503 A | 8/2006 |
| JP | 2008-41253 A | 2/2008 |
| JP | 2008-276949 A | 11/2008 |
| JP | 2009-545410 A | 12/2009 |
| JP | 2011-115760 A | 6/2011 |
| JP | 2011-152795 A | 6/2011 |
| JP | 2012-62222 A | 3/2012 |
| KR | 10-2001-0067113 A | 7/2001 |
| WO | WO 2004/114444 A1 | 12/2004 |
| WO | WO 2008/014557 A1 | 2/2008 |
| WO | WO 2014/129597 A1 | 8/2014 |

OTHER PUBLICATIONS

Toray Research Center, The TRC News No. 108, Jul. 2009, pp. 31-36.
Written Opinion of the International Searching Authority for PCT/JP2014/083043 (PCT/ISA/237) dated Mar. 17, 2015.
Canadian Office Action and Search Report, dated Apr. 25, 2017, for corresponding Canadian Application No. 2,932,709.

\* cited by examiner

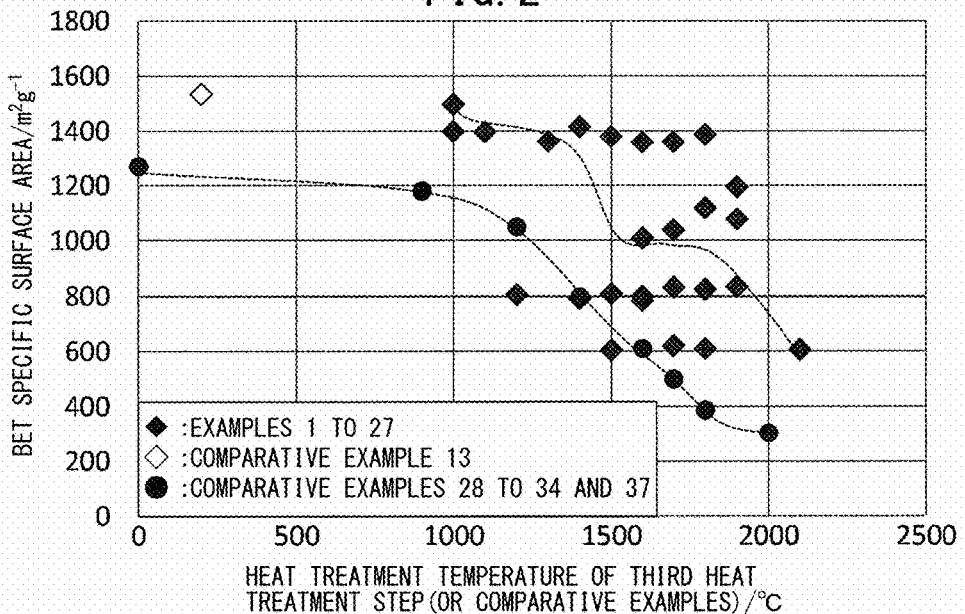
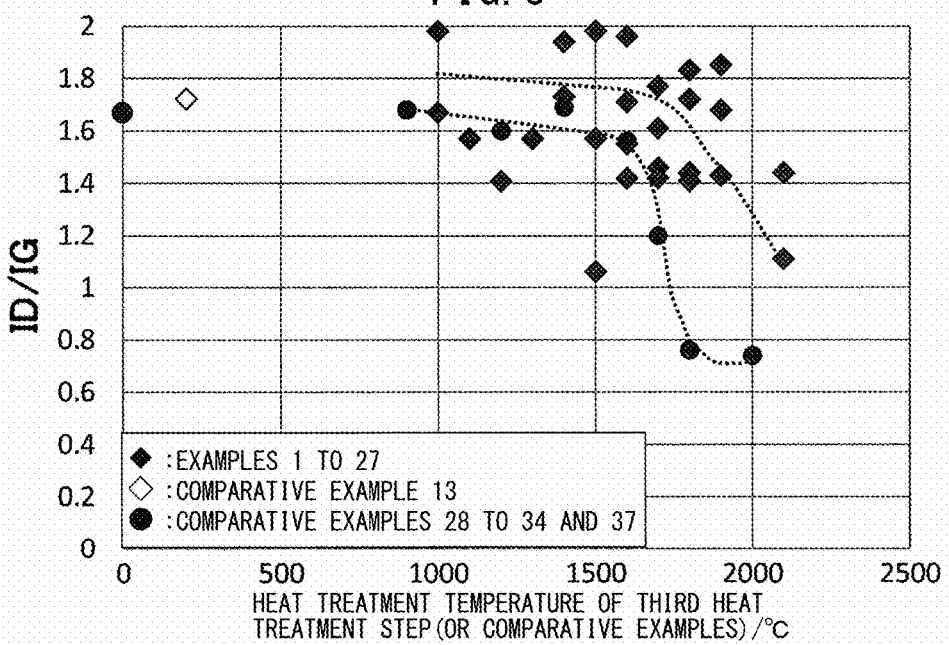

PLATINUM CATALYST PARTICLES ARE UNIFORMLY AFFIXED AT CARBON SUPPORT

THERE ARE PARTS WHERE PLATINUM CATALYST PARTICLES ARE NOT AFFIXED AT CARBON SUPPORT

CARBON SUPPORT MATERIAL FOR SOLID POLYMER TYPE FUEL CELL USE AND METAL CATALYST PARTICLE-SUPPORTING CARBON MATERIAL AND METHODS OF PRODUCTION OF SAME

TECHNICAL FIELD

This invention relates to a carbon support material for solid polymer type fuel cell use and a metal catalyst particle-supporting carbon material and methods of production of the same.

BACKGROUND ART

A solid polymer type fuel cell, in general, is comprised of a proton conducting electrolytic membrane sandwiched between an anode formed by a catalyst layer and a cathode formed by a catalyst layer. Furthermore, these are sandwiched between gas diffusion layers at their outsides. Furthermore, separators are arranged at the outsides of the same. This structure constitutes the basic structure. Such a basic structure is called a "unit cell". Further, a fuel cell is usually comprised of a number of unit cells required for achieving the required output stacked together.

To take out current from such a basic structure of a solid polymer type fuel cell (unit cell), gas flow paths of the separators arranged at the anode side and cathode side supply the cathode side with oxygen or air or other oxidizing gas and, further, the anode side with hydrogen or other reducing gas. The thus supplied oxidizing gas and reducing gas are supplied through these gas diffusion layers to the catalyst layers. The energy difference (potential difference) between the chemical reaction occurring at the catalyst layer of the anode and the chemical reaction occurring at the catalyst layer of the cathode is utilized to take out current. For example, when using hydrogen gas and oxygen gas, the energy difference (potential difference) between the chemical reaction occurring on the metal catalyst particles of the catalyst layer of the anode [$H_2 \rightarrow 2H^+ + 2e^- (E_0=0V)$] and the chemical reaction occurring on the metal catalyst particles of the catalyst layer of the cathode [$O_2+4H^++4e^- \rightarrow 2H_2O$ ($E_0=1.23V$)] is taken out as current.

Therefore, unless the gas diffusion paths through which the oxidizing gas or reducing gas moves from the gas flow paths of a separator to the metal catalyst particles inside the catalyst layer at the cathode side or anode side, the proton conducting paths through which protons ($H^+$) generated on the metal catalyst particles of the anode catalyst layer pass through the proton conducting electrolytic membrane and move to the metal catalyst particles of the cathode catalyst layer, and, furthermore, the electron conducting paths through which the electrons ($e^-$) generated on the metal catalyst particles of the anode catalyst layer pass through the gas diffusion layer, separator, and outside circuit to move to the metal catalyst particles of the cathode catalyst layer continue to be connected without being split, current cannot efficiently be taken out.

Further, inside a catalyst layer, in general, it is also important that the pores formed in the clearances of the component materials and forming diffusion paths for the oxidizing gas or reducing gas, the electrolyte materials forming the proton conducting paths, and the carbon material or metal material or other conductive material forming the electron conducting paths be connected to form a network.

Further, for the proton conducting electrolytic membrane or proton conducting path in the catalyst layer (proton conducting electrolyte of ionomer), a polymer electrolyte material comprised of an ion exchange resin such as a perfluorosulfonic acid polymer is being used, but, in general, such a polymer electrolyte material first exhibits high proton conductivity in a moist environment. In a dry environment, the proton conductivity ends up falling. Therefore, to make a fuel cell operate efficiently, the polymer electrolyte material has to be maintained in a sufficiently moist state. Water vapor is supplied together with the gas supplied to the cathode side or anode side to maintain it in a moistened condition.

However, under such a moistened condition, the $H_2O$ generated on the metal catalyst particles of the cathode catalyst layer obstructs the diffusion of oxidizing gas at the gas diffusion paths in the cathode catalyst layer. As a result, the phenomenon arises of the cell performance of the solid polymer type fuel cell falling (flooding). For example, NPLT 1 describes that the hydrophilic functional groups of the carbon carrier adsorb $H_2O$ and that the $H_2O$ easily remains in the catalyst layer thereby causing a drop in the diffusion of the oxygen gas and is believed to be a factor behind flooding.

Further, in general, to obtain a solid polymer type fuel cell excellent in cell performance, it is necessary that the metal catalyst particles in the metal catalyst particle-supporting carbon material be supported on the carbon support material in a "highly dispersed state" and affixed state. Here, a "highly dispersed state" is the state where, to enable oxidizing gas to diffuse and water to be drained, the metal catalyst particles are dispersed on the carbon support material at a certain distance from each other and so as not to be separated more than necessary. Hereinafter, in this Description, the carbon material serving as the support at which the metal catalyst particles are supported will be called a "carbon support material".

Therefore, to provide a solid polymer type fuel cell excellent in power generation performance under highly moistened conditions, the characteristics sought from a carbon support material are as follows:
(a) few hydrophilic functional groups at the carbon support material.
(b) carbon support material having large surface area for enabling carbon support material to support metal catalyst particles in a highly dispersed state.
(c) carbon support material having a suitable number of sites for affixing the metal catalyst particles at the carbon support material in a highly dispersed state.

Specifically, the characteristic of (a) requires reduction of the hydroxyl groups and carboxyl groups and other hydrophilic functional groups containing hydrogen at the ends of the functional groups at the carbon support material and suppression of flooding. Further, the characteristic of (b) requires giving the carbon support material a large surface area so as to enable oxidizing gas to diffuse and water to be drained and to cause the metal catalyst particles to be dispersed so as to be a certain distance from each other and so as not to be unnecessarily separated. Furthermore, the characteristic of (c) requires supporting the metal catalyst particles at the carbon support material in a highly dispersed state by increasing the surface area of the carbon support material and also suitably providing sites for affixing the metal catalyst particles at the carbon support material in a highly dispersed state. Even if the surface area of the carbon support material is large, if the number of sites for affixing the metal catalyst particles is small, the metal catalyst particles cannot be made to be supported at the carbon support material in a highly dispersed state. Therefore, the above characteristics of (a), (b), and (c) are matters necessary and essential which have to be achieved in order to provide a solid polymer type fuel cell excellent in power generation performance under highly moistened conditions.

Therefore, in the past as well, several attempts have been made to develop solid polymer type fuel cells excellent in power generation performance under highly moistened conditions. For example, PLT 1 proposes as a method for achieving the above characteristic of (a) introducing modifying groups comprised of hydrophobic functional groups of fluorinated groups at the surface of a carbon support material comprised of carbon black or other carbon particles and thereby reducing the occurrence of flooding.

Further, PLT 2 proposes a solid polymer type fuel cell using commercially available activated carbon or carbon black or another carbon support material to optimize the structure of the catalyst layer for good gas diffusion and thereby prevent water generated on the metal catalyst particles from closing the diffusion paths and realize high cell performance without regard as to the moistened conditions.

Furthermore, other than the approaches of the above PLTs 1 and 2, PLT 3 discloses a carbon support material produced by the following method as a material having the above characteristics of (b) and (c). That is, it discloses a method of production of a solid polymer type fuel cell-use carbon support material comprising a step of blowing acetylene gas into a solution containing a metal or metal salt and forming a metal acetylide (acetylide forming step), a first heat treatment step of heating the metal acetylide at a temperature of 60 to 80° C. for 12 hours or more to make the metal precipitate and be included as metal particles and prepare a metal particle-containing intermediate, a second heat treatment step of heating the metal particle-containing intermediate at a temperature of 160 to 200° C. for 10 to 30 minutes and ejecting the metal particles from the metal particle-containing intermediate to obtain a carbon material intermediate, a dissolution and washing treatment step bringing the carbon material intermediate obtained by the second heat treatment step into contact with a nitric acid aqueous solution, in particular concentrated nitric acid, and dissolving away the ejected metal particles and other unstable carbon compounds to clean the carbon material intermediate (washing treatment step), and a third heat treatment step of heating the carbon material intermediate cleaned in the dissolution and washing treatment step in a vacuum, in an inert gas atmosphere, or in an air atmosphere, at a temperature of 180 to 200° C. for 24 to 48 hours to obtain the carbon support material.

CITATION LIST

Patent Literature

PLT 1: Japanese Patent Publication No. 2006-216503A
PLT 2: Japanese Patent Application No. 2011-152795
PLT 3: Japanese Patent Application No. 2009-545410

Non-Patent Literature

NPLT 1: Toray Research Center, The TRC News, No. 108 (July 2009)

SUMMARY OF INVENTION

Technical Problem

However, in the method of PLT 1, to give the above characteristic of (a), use of a fluorine-based gas in the step of newly introducing functional groups on the carbon support material is essential. Further, due to the fluorinated groups being introduced, the surface area for supporting the metal catalyst particles falls. Further, the sites for affixing the metal catalyst particles end up being replaced by fluorinated groups. The above characteristics of (b) and (c) demanded from the carbon support material unavoidably fall. An effect against flooding can be expected, but rather the effect is reverse in the point of making the metal catalyst particles be supported in a highly dispersed state. The ability as a carbon support material ends up falling.

Further, in the method of PLT 2, there is the advantage of enabling a high cell performance to be exhibited regardless of the moistened conditions, but under highly moistened conditions, there is the problem that the hydrophilic functional groups at the surfaces of the commercially available activated carbon or carbon black or other carbon support material unavoidably adsorb $H_2O$ and $H_2O$ tends to remain in the catalyst layer.

Furthermore, the inventors checked the cell performance for the carbon support material obtained by the method of PLT 3 under those highly moistened conditions, whereupon a drop in performance due to flooding was seen and sufficient cell voltage could not be obtained. Further, they studied in detail the reasons for this and as a result could confirm that the above characteristics of (b) and (c) were satisfied, but found that the above characteristic of (a) was not satisfied.

Further, the inventors checked the cell performance of commercially available carbon support materials under highly moistened conditions, but a drop in performance was seen due to flooding or metal catalyst particles not being supported at the carbon support material in a highly dispersed state. It was learned that there has not been a carbon support material satisfying all of the above characteristics of (a), (b), and (c) up until now.

In this regard, it may be considered to apply the art described in PLT 1 to the carbon support material described in PLT 3 and impart the above characteristic of (a) missing in PLT 3, but with the method of introducing fluorinated groups of PLT 1, the above characteristics of (b) and (c) greatly fall and while the drop in performance due to flooding can be reduced, the ability of the carbon support material to realize the cell performance of the fuel cell ends up being sacrificed.

From the above, the present invention has as its object to obtain a carbon support material satisfying all of the above characteristics of (a), (b), and (c).

Solution to Problem

Therefore, the inventors engaged in in-depth studies to develop a carbon support material able to satisfy all of the characteristics of (a) to (c) and as a result thought that to satisfy the above characteristic of (a), it is necessary to reduce the hydrogen content (mass %) in the carbon support material. This is because the hydrogen content in the carbon support material corresponds to the amount of hydrogen of the end parts of the hydrophilic functional groups. Further, they thought that to satisfy the above characteristic of (b), it is necessary to increase the BET surface area ($m^2/g$) calculated from the nitrogen adsorption BET specific surface area and, furthermore, to satisfy the above characteristic of (c), it is necessary to establish the presence of a suitable amount of edge parts of graphite interacting between the carbon support material and the metal catalyst particles, that is, that the crystallites of graphite be in a suitable range.

Here, the "edge parts of graphite" indicate the end parts of the crystallites. The crystallites of graphite (La) are proposed in the formula La=44Å/($I_D/I_G$) [F. Tuinstra, J. L. Koenig, J. Chem. Phys., 53, p. 1126 (1970)]. $I_D/I_G$ indicates the relative intensity ratio between the peak intensity of the range of 1200 to 1400 cm$^{-1}$ obtained from the Raman spectrum and called the "D-band" (below, $I_D$) and the peak intensity of the range of 1500 to 1700 cm$^{-1}$ called the "G-band" (below, $I_G$). It is sufficient to control the edge parts of graphite so that this $I_D/I_{GH}$ becomes a suitable range. That is, if the $I_D/I_G$ is large and the crystallites are small, the number of edges becomes greater. Note that, the edge parts of graphite are believed to have functional groups containing oxygen such as quinone groups or lactone groups present at them (Z. Lin et al., J. Phys. Chem. C 115, p. 7120 (2011)]. It is believed that the metal catalyst particles are affixed to the carbon support material due to the electrostatic interaction between the lone pairs of electrons of this oxygen and the metal catalyst particles.

Further, the inventors decided to reexamine and further improve the method of production of a carbon support material of PLT 3 and studied in detail the manufacturing process of the carbon support material of this PLT 3 as a specific measure for developing a carbon support material satisfying all of the above characteristics of (a) to (c). As a result, they learned that to reduced the hydrogen content in the carbon support material, it is necessary to suppress the introduction of hydrophilic functional groups containing hydrogen in the dissolution and washing treatment step (washing treatment step) where hydrogen is introduced into the carbon support material and promote the desorption of the hydrophilic functional groups containing hydrogen in the third heat treatment step where the hydrogen introduced into the carbon support material is desorbed. Furthermore, they proceeded with studies on how to suppress the introduction of hydrophilic functional groups in the dissolution and washing treatment step and promote the desorption of the hydrophilic functional groups in the third heat treatment step.

As a result of the above detailed studies, the inventors were able to produce a new carbon support material satisfying all of the above characteristics of (a) to (c) by using hot concentrated sulfuric acid in the dissolution and washing treatment step (washing treatment step) instead of the previous nitric acid aqueous solution (concentrated nitric acid) and, further, by raising the heating temperature in the third heat treatment step from the previous 180 to 200° C. to 1000 to 2100° C. and thereby succeeded in the development of a carbon support material and metal catalyst particle-supporting carbon material suitable for production of a solid polymer type fuel cell excellent in high moisture operating performance and completed the present invention.

That is, the present invention is comprised of the following:

(1) A solid polymer type fuel cell-use carbon support material comprised of a porous carbon material with a hydrogen content (mass %, below sometimes indicated as "H") of 0.004 mass % to 0.010 mass % in range, a nitrogen adsorption BET specific surface area (m$^2$/g, below sometimes indicated as "S") of 600 m$^2$/g to 1500 m$^2$/g, and a relative intensity ratio ($I_D/I_G$) of a peak intensity ($I_D$) of the range of 1200 to 1400 cm$^{-1}$ obtained from the Raman spectrum and called the "D-band" and a peak intensity ($I_G$) of the range of 1500 to 1700 cm$^{-1}$ called the "G-band" (below, sometimes abbreviated as the "Raman relative intensity ratio") of 1.0 to 2.0.

(2) The solid polymer type fuel cell-use carbon support material according to (1), wherein the hydrogen content is 0.004 mass % to 0.006 mass % and the relative intensity ratio ($I_D/I_G$) found from the Raman spectrum is 1.4 to 2.0.

(3) The solid polymer type fuel cell-use carbon support material according to (1) wherein the nitrogen adsorption BET specific surface area is 800 m$^2$/g to 1400 m$^2$/g and the relative intensity ratio ($I_D/I_G$) found from the Raman spectrum is 1.4 to 2.0.

(4) The solid polymer type fuel cell-use carbon support material according to (1) wherein the hydrogen content is 0.004 mass % to 0.006 mass %, the nitrogen adsorption BET specific surface area is 800 m$^2$/g to 1400 m$^2$/g, and the relative intensity ratio ($I_D/I_G$) found from the Raman spectrum is 1.4 to 2.0.

(5) A solid polymer type fuel cell-use metal catalyst particle-supporting carbon material comprised of the solid polymer type fuel cell-use carbon support material according to any one of (1) to (4) on which metal catalyst particles of Pt alone or mainly Pt are supported.

(6) A method of production of a solid polymer type fuel cell-use carbon support material according to any one of (1) to (4), the method of production of a solid polymer type fuel cell-use carbon support material comprising an acetylide forming step of blowing acetylene gas into a solution containing a metal or metal salt and forming a metal acetylide, a first heat treatment step of heating the metal acetylide at 60° C. to 80° C. in temperature and preparing a metal particle-containing intermediate in which metal particles are contained, a second heat treatment step of heating the metal particle-containing intermediate at 160° C. to 200° C. in temperature, causing metal particles to be ejected from the metal particle-containing intermediate, and obtaining a carbon material intermediate, a washing treatment step of bringing the carbon material intermediate obtained at the second heat treatment step into contact with hot concentrated sulfuric acid and cleaning the carbon material intermediate, and a third heat treatment step of heating the carbon material intermediate cleaned at the washing treatment step in a vacuum, in an inert gas atmosphere, or in an air atmosphere to 1000° C. to 2100° C. in temperature to obtain a carbon support material.

(7) A method of production of a solid polymer type fuel cell-use metal catalyst particle-supporting carbon material comprising causing a carbon support material according to any one of (1) to (4) obtained by the method according to (6) to be dispersed into a liquid dispersion medium, adding to the obtained dispersion a complex or salt of a metal mainly comprised of platinum and a reducing agent, reducing the metal ions in a liquid phase to cause the precipitation of fine metal catalyst particles mainly comprised of platinum, and supporting the precipitated metal catalyst particles on the carbon support material to thereby produce a solid polymer type fuel cell-use metal catalyst particle-supporting carbon material according to (5).

In the carbon support material for solid polymer type fuel cell use of the present invention, the hydrogen content (H) found has to be 0.004 mass % to 0.010 mass %, preferably is 0.004 mass % to 0.006 mass %. If this H is less than 0.004 mass %, there will be few hydrophilic functional groups present at the carbon support material and, while effective against flooding, the hydrophilicity of the carbon support material will be excessively lost, the proton conductivity of the polymer membrane achieved due to the moist environment will fall, and a good cell performance will not be able to be obtained when utilized for a fuel cell. Conversely, if H becomes greater than 0.010 mass %, in the same way as a conventional carbon support material, the hydrophilic functional groups present at the carbon support material will become too numerous and the water produced on the metal catalyst particles will obstruct the diffusion paths of the oxidizing gas, so the problem of flooding will not be solved.

As the method of measuring the hydrogen content in the carbon support material, a technique able to analyze fine amounts of hydrogen should be used. For example, the inert gas fusion thermal conductivity method may be illustrated. In this method, a sample of the carbon support material is placed in a graphite crucible and heated to a predetermined temperature (for example, 800° C. or more) to separate the generated hydrogen from other gas. A heat conductivity detector is then used to measure the amount of hydrogen.

Further, in the carbon support material for solid polymer type fuel cell use of the present invention, the nitrogen adsorption BET specific surface area (S) has to be 600 $m^2/g$ to 1500 $m^2/g$, preferably is 800 $m^2/g$ to 1400 $m^2/g$. If this S is less than 600 $m^2/g$, the carbon support material will not have the surface area required for supporting the metal catalyst particles in a highly dispersed state, the particle distance between metal catalyst particles supported on the carbon support material becomes narrower, the diffusibility of the oxidizing gas becomes insufficient, and the cell performance in the case of use for a fuel cell falls. Conversely, if this S becomes larger and exceeds 1500 $m^2/g$, while an ideal surface area for making the carbon support material support the metal catalyst particles in a highly dispersed state, the upper limit value of S is determined by the heating conditions in the third heat treatment step of the manufacturing process explained later. There is a tradeoff in making the value of S larger and making the value of the hydrogen content (H) smaller. If making the value of S larger, the value of H also becomes larger and the problem of flooding arises, so the value of S cannot be made larger exceeding 1500 $m^2/g$. The nitrogen adsorption BET specific surface area may be measured by the single-point BET method using nitrogen gas as the adsorbed gas.

Furthermore, in the carbon support material for solid polymer type fuel cell use of the present invention, the value of the relative intensity ratio ($I_D/I_G$) of a peak intensity ($I_D$) of the range of 1200 to 1400 $cm^{-1}$ obtained from the Raman spectrum and called the "D-band" and a peak intensity ($I_G$) of the range of 1500 to 1700 $cm^{-1}$ called the "G-band" (Raman relative intensity ratio) has to be 1.0 to 2.0, preferably is 1.4 to 2.0. If the value of this Raman relative intensity ratio ($I_D/I_G$) is less than 1.0, the amount of edge parts of graphite becomes insufficient, it becomes harder for the metal catalyst particles to be affixed to the carbon support material, and the cell performance when used for a fuel cell ends up falling. Conversely, if this Raman relative intensity ratio ($I_D/I_G$) is over 2.0, the edge parts of graphite becomes too great in amount and chemically weak. Under the operating conditions of the solid polymer fuel cell, the carbon support material is easily consumed by oxidation and the fuel cell falls in durability. The Raman spectrum should be obtained using a commercially available laser Raman spectrometer.

Here, reduction of the hydrogen content (H) shows reduction of the amount of hydrophilic functional groups causing flooding, so contributes greatly to the cell performance of a fuel cell and has a large effect on the cell performance under highly moistened conditions, in particular the power generation performance. Further, increase in the nitrogen adsorption BET specific surface area (S) contributes greatly to the cell performance of the fuel cell and, further, is larger in fluctuation of numerical value compared with the Raman relative intensity ratio ($I_D/I_G$) and is a precondition for making the carbon support material support the metal catalyst particles in a highly dispersed state.

In particular, when producing a fuel cell using a carbon support material with a hydrogen content (H) of 0.004 mass % to 0.006 mass %, a nitrogen adsorption BET specific surface area (S) of 800 $m^2/g$ to 1400 $m^2/g$, and a Raman relative intensity ratio ($I_D/I_G$) of 1.4 to 2.0, a better cell performance can be achieved. That is, if using such a carbon support material, the hydrophilicity will not be excessively lost, so there will be no drop in the proton conductivity of the polymer membrane achieved due to the moist environment. Further, the occurrence of flooding can be effectively suppressed, there are a sufficient surface area and edge parts of graphite for causing high dispersion of the metal catalyst particles supported at the carbon support material, the particle distance between metal catalyst parties supported on the carbon support material becomes broader, diffusibility of the oxidizing gas is sufficiently secured, and it becomes possible to produce a fuel cell excellent in cell performance.

Further, in the metal catalyst particle-supporting carbon material for solid polymer type fuel cell use of the present invention, the metal catalyst particles used are mainly comprised of Pt. The catalyst metal may be Pt alone or, further, may contain another catalyst metal other than Pt. Further, as this catalyst metal able to be added other than Pt, one or a mixture of two or more of the Co, Ni, Fe, Pd, Au, Ru, Rh, Ir, etc. which are added for the purpose of improving the activity of the metal catalyst may be illustrated. The amount of addition of the catalyst metal other than Pt is a ratio of the number of atoms of this catalyst metal other than Pt with respect to the number of atoms of all catalyst metals in the metal catalyst particles (atomic percentage) of 0 to 50 at % in range, preferably 33 to 50 at % in range. If the amount of addition of this catalyst metal other than Pt becomes higher than 50 at %, the ratio of the added elements at the surface of the metal catalyst particles will become greater and the elements will dissolve during operation of the fuel cell resulting in a drop in the cell performance.

Further, the supporting rate of metal catalyst particles (mass %) in the metal catalyst particle-supporting carbon material of the present invention should be 10 to 60 mass % with respect to the total mass of the metal catalyst particles and the carbon support material, preferably 20 to 50 mass % in range. When forming a solid polymer type fuel cell using a metal catalyst particle-supporting carbon material as the catalyst layer, diffusion of the hydrogen or other reducing gas or oxygen or other oxidizing gas used as fuel at the time of power generation is essential. This rate is a condition for improving the diffusion of the reducing gas or oxidizing gas in the catalyst layer. Further, the supporting rate of metal catalyst particles is correlated with the particle distance of metal catalyst particles. If the amounts of metal catalyst particles in the catalyst layer are equal, if the supporting rate of metal catalyst particles is low, the catalyst layer will become thick, the diffusibility of the oxidizing gas will fall, and the cell performance will fall. However, if the supporting rate of metal catalyst particles is low, the particle distance between metal catalyst particles becomes longer, so the metal catalyst particles will not aggregate. By maintaining a suitable particle distance, the diffused oxidizing gas can be made to efficiently react at the surface of the metal catalyst particles. Conversely, if the supporting rate of metal catalyst particles is high, the catalyst layer become thin and the diffusion of oxidizing gas tends to become easier, but the particle distance between metal catalyst particles becomes shorter, the metal catalyst particles aggregate, and the surface area of the metal catalyst particles falls, so the problem arises that diffused oxidizing gas cannot efficiently react at the surface of the metal catalyst particles.

The method of production of a carbon support material of the present invention is not particularly limited. For example, the material is produced by the method shown below. That is, acetylene gas is blown into a solution containing a metal or metal salt to cause the formation of a metal acetylide (acetylide forming step).

Next, the formed metal acetylide is heated at 60° C. to 80° C. in temperature to cause the metal to precipitate as metal particles and obtain a metal particle-containing intermediate in which the metal particles are contained (first heat treatment step). The heating time at this first heat treatment step is usually 12 hours or more, preferably 12 to 24 hours.

The thus obtained metal particle-containing intermediate is next heated at 160° C. to 200° C. in temperature to make the metal particle-containing intermediate explode and eject the metal particles from the metal particle-containing intermediate and thereby obtain a carbon material intermediate (second heat treatment step). The heating time at this second heat treatment step is usually 10 to 30 minutes, preferably 20 to 30 minutes.

The carbon material intermediate obtained by this second heat treatment step is next brought into contact with hot concentrated sulfuric acid to dissolve and wash away the metal particles ejected at the second heat treatment step and sticking to the surface and other unstable carbon compounds so as to clean the carbon material intermediate and to reduce the hydrogen content (H) of the carbon material intermediate by the dehydrating action of the hot concentrated sulfuric acid (washing treatment step). The washing treatment of the carbon material intermediate using this hot concentrated sulfuric acid is performed using concentrated sulfuric acid of a sulfuric acid concentration of 90 mass % or more, preferably 96 mass % or more, more preferably 98 mass % or more, under heating at a temperature of 120° C. or more, preferably 140° C. or more, more preferably 160° C. or more, for 30 minutes or more, preferably 30 to 60 minutes, more preferably 30 minutes, as treatment conditions. That is, in the present invention, "hot concentrated sulfuric acid" means concentrated sulfuric acid with a temperature of the concentrated sulfuric acid (treatment temperature) of 120° C. or more, preferably 140° C. or more, more preferably 160° C. or more. Note that, if the sulfuric acid concentration is less than 90 mass %, the dehydrating action of the concentrated sulfuric acid is low and, further, the reactivity with respect to the carbon support material surface becomes higher. The latter is, specifically, because the $H_2O$ added when diluting the sulfuric acid concentration reacts with the carbon support material surface and therefore the edge parts of the graphite tend to increase. Accordingly, if the sulfuric acid concentration is less than 90 mass %, this is inappropriate in the present invention. Conversely, the sulfuric acid concentration being high is preferable in the present invention. Concentrated sulfuric acid of a sulfuric acid concentration of 100 mass % can be suitably used. Further, if the temperature of the concentrated sulfuric acid (treatment temperature) is less than 120° C., the reactivity with respect to the carbon support material surface is poor, the surface area tends to decrease, and the dissolution of metal particles and other unstable carbon compounds and the desired dehydrating action cannot be obtained. Conversely, there is no particular upper limit on the temperature (treatment temperature) of this concentrated sulfuric acid. The sulfuric acid can be applied up to its boiling point (290° C.).

The washed carbon material intermediate obtained through the second heat treatment step and washing treatment step is heated in a vacuum, in an inert gas atmosphere, or in an air atmosphere, at a temperature of a temperature range of 1000° C. to 2100° C., preferably 1600° C. to 2000° C., more preferably 1600° C. to 1900° C., for example for 2 to 5 hours (third heat treatment step). Due to this heat treatment, hydrogen is desorbed from the carbon material intermediate, the hydrogen content (H) is reduced, and a carbon support material satisfying the above characteristics of (a), (b), and (c) of the present invention is obtained. In this third heat treatment step, if the heating temperature is less than 1000° C., the obtained carbon support material is left with hydroxyl groups or carboxyl groups or other hydrophilic functional groups which have not been completely desorbed and the value of H ends up exceeding 0.010. In a fuel cell produced using this carbon support material, the water formed on the metal catalyst particles supported on the carbon support material is liable to obstruct the diffusion of the oxidizing gas, i.e, to cause the problem of flooding. Conversely, if heating to over 2100° C., the value of the nitrogen adsorption BET specific surface area (S) sometimes does not reach 600 $m^2/g$. The surface area required for making the carbon support material support the metal catalyst particles in a highly dispersed state is not obtained.

Further, the method of production of the metal catalyst particle-supporting carbon material for solid polymer type fuel cell use of the present invention is not particularly limited, but for example the method shown below can be illustrated. That is, first, the thus produced carbon support material is made to disperse in a liquid dispersion medium. In the obtained dispersion, a complex or salt of metal mainly comprised of platinum and a reducing agent are added. In the liquid phase, the metal ions are reduced to cause precipitation of fine metal catalyst particles mainly comprised of platinum. The precipitated metal catalyst particles are supported at the carbon support material.

Here, the metal catalyst particles supported at the carbon support material in the highly dispersed state have a size of 1 to 6 nm or so. Production of this size of metal catalyst particles by a uniform particle size is mechanically or physically impossible. The particles are formed chemically by reduction of the metal ions. That is, as explained above, the method entails reducing a complex of metal mainly comprised of platinum or a metal salt by a reducing agent in a liquid phase to form the metal catalyst particles. Here, as the applicable reducing agents, sodium borohydride, potassium borohydride, lithium borohydride, hydrazine, formaldehyde, and other aldehydes, ethanol, propanol, and other alcohols, ethyleneglycol and other polyols, citric acid, oxalic acid, formic acid, and other carboxylic acids etc. may be used. Further, to produce high activity metal catalyst particles, addition of a colloid agent or other compound covering the catalyst surface should be avoided. For this reason, the carbon support material is made to disperse in a liquid-solid dispersion medium in advance and the metal catalyst particles produced by reduction are made to stick to the carbon support material before the metal catalyst particles aggregate and become larger in size. Furthermore, the particle size of the metal catalyst particles produced can be optimized by control of the strength of the reducing agent, the concentration of the metal catalyst particles, the concentration of the carbon support material, and other control factors.

The above-mentioned carbon support material for solid polymer type fuel cell use of the present invention has the above characteristic of (a) "few hydrophilic functional groups at the carbon support material", the characteristic of (b) "carbon support material having large surface area for enabling carbon support material to support metal catalyst particles in a highly dispersed state", and the characteristic of (c) "carbon support material having a suitable number of sites for affixing the metal catalyst particles at the carbon support material in a highly dispersed state". Further, the metal catalyst particle-supporting carbon material for solid polymer type fuel cell use of the present invention is used for fuel cells operated under highly moistened conditions and exhibits excellent cell performance.

Further, in PLT 2, the structure of the catalyst layer was optimized for good gas diffusion so as to realize high cell performance even when not under moistened conditions, but even when using the carbon support material of the present invention, it is possible to optimize the structure of the catalyst layer for good gas diffusion in the same way as the case of PLT 2 so as to realize high cell performance even when not under moistened conditions.

Note that, in the above explanation, among the applications as electrodes of solid polymer type fuel cells, application as a cathode electrode where stringent conditions are sought was described, but of course the invention can also be used in application as an anode electrode where the conditions sought are easier than a cathode electrode.

Advantageous Effects of Invention

The carbon support material for solid polymer type fuel cell use and metal catalyst particle-supporting carbon material of the present invention exhibit high cell performance under highly moistened conditions when used for fuel cells compared with the conventional commercially available carbon support material and metal catalyst particle-supporting carbon material.

BRIEF DESCRIPTION OF DRAWINGS

FIG. 2 is a graph showing the results of investigation of the treatment temperature at the third heat treatment step and the nitrogen adsorption BET specific surface area (S) for the case of Invention Examples 1 to 27, the case of Comparative Example 13 of PLT 3, and the case of Comparative Example 37 of PLT 2.

FIG. 3 is a graph showing the results of investigation of the treatment temperature at the third heat treatment step and the Raman relative intensity ratio ($I_D/I_G$) for the case of Invention Examples 1 to 27, the case of Comparative Example 13 of PLT 3, and the case of Comparative Example 37 of PLT 2.

DESCRIPTION OF EMBODIMENTS

Figure 1:
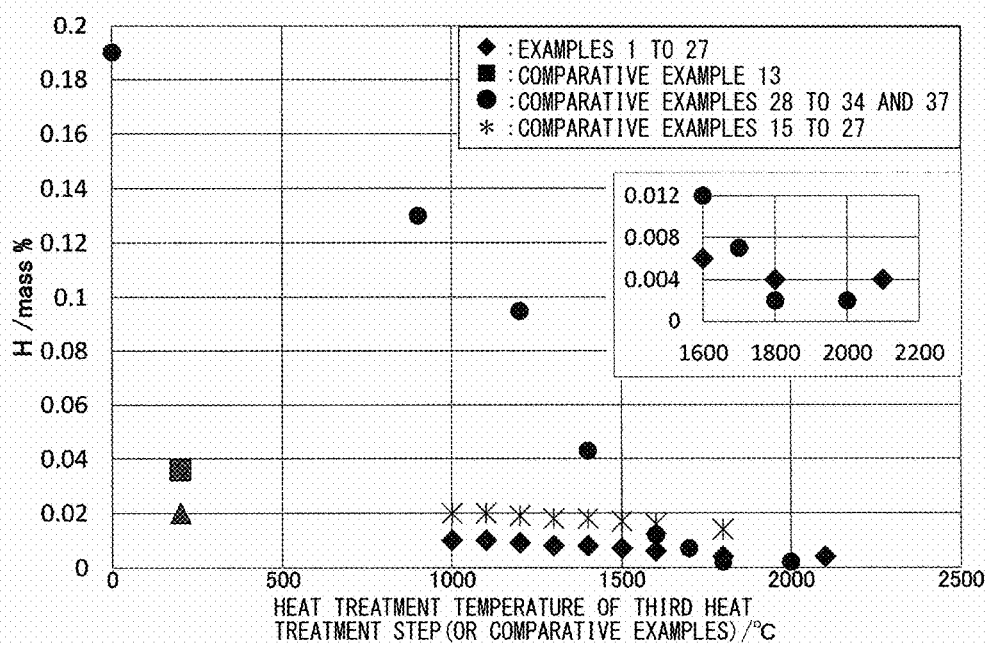
FIG. 1 is a graph showing the results of investigation of the treatment temperature at the third heat treatment step and the hydrogen content (H) for the case of Invention Examples 1 to 27, the case of Comparative Example 13 of PLT 3, and the case of Comparative Example 37 of PLT 2.

Below, examples and comparative examples will be used as the basis to explain the carbon support material for solid polymer type fuel cell use and metal catalyst particle-supporting carbon material of the present invention.

Examples 1 to 27 and Comparative Examples 1 to 37

1. Production of Carbon Support Material
(1) Acetylide Forming Step

In the following examples and comparative examples, silver was selected as the metal of the metal acetylide forming the precursor for producing the carbon support material. First, an ammonia aqueous solution ($NH_3$ concentration: 1.9 mass %) containing silver nitrate in a concentration of 1.1 mol % was prepared in a flask. The air inside this flask was replaced with inert gas (argon, dry nitrogen, etc.) to remove the oxygen, then acetylene gas was blown into 150 ml of the ammonia aqueous solution of silver nitrate while stirring at a flow rate of 25 ml/min to cause solids of silver acetylide to precipitate in the ammonia aqueous solution. Next, the precipitate was filtered by a membrane filter. The obtained precipitate was washed by methanol. Furthermore, after washing, some methanol was added to impregnate this precipitate with methanol.

(2) First Heat Treatment Step

Next, the precipitates in the form impregnated with methanol were divided up and inserted in 50 mg amounts in diameter 5 mm or so test tubes. These were placed in a vacuum heating vessel and heated at a temperature of 60 to 80° C. for 12 hours to prepare the silver particle-containing intermediates.

(3) Second Heat Treatment Step

The silver particle-containing intermediates obtained at the above first heat treatment step were not taken out from the vacuum heating vessel but were made to rise in temperature continuously in a vacuum as they were until temperatures of 160 to 200° C. They were heated at this temperature for 20 minutes and explosions were caused for ejecting the silver particles from the silver particle-containing intermediates to obtain the carbon material intermediates.

(4) Washing Treatment Step

The carbon material intermediates after ejection of the silver particles obtained in the second heat treatment step were brought into contact with 96 mass % concentrated sulfuric acid at 200° C. for 1 hour as shown in Table 1 and Table 2 to wash them in hot concentrated sulfuric acid washing treatment or were brought into contact with concentrated nitric acid for 1 hour to wash them in concentrated nitric acid washing treatment. By this, the silver particles and other unstable carbon compounds remaining at the surfaces of the carbon material intermediates were removed to clean the surfaces.

(5) Third Heat Treatment Step

The carbon material intermediates cleaned at the washing treatment step were heat treated in an inert atmosphere at the treatment temperatures shown in Table 1 and Table 2 for 2 hours to obtain the carbon support materials of Examples 1 to 27 and Comparative Examples 1 to 27. Note that Comparative Example 13 corresponds to the carbon support material of PLT 3.

Comparative Examples 28 to 34

In Comparative Examples 28 to 34, a commercially available product of a carbon support material (made by Lion Corporation, product name EC600JD) was used and treated by third heat treatment at the treatment temperatures shown in Table 2 to obtain the carbon support materials of Comparative Examples 28 to 34.

Comparative Examples 34 to 36

In Comparative Example 34, a commercially available product of a carbon support material (made by Denka, product name: Denka Black FX-35) was used as is as the carbon support material of Comparative Example 34. In Comparative Example 35, a commercially available product of a carbon support material (made by Kuraray Chemical, product name: YP50F) was used as is as the carbon support material of Comparative Example 35. In Comparative Example 36, the commercially available product of a carbon support material (made by Lion Corporation, product name: EC600JD) was used as is as the carbon support material of Comparative Example 36 and corresponds to the carbon support material of PLT 2.

A: Measurement of Hydrogen Content (H) in Carbon Support Material

Each of the above prepared carbon support materials of Examples 1 to 27 and Comparative Examples 1 to 37 was measured for its hydrogen content (H) as follows. The measurement was performed using a gas analysis apparatus (made by RECO, RH402) by the inert gas fusion thermal conductivity method. First, the carbon support material of a sample was weighed to about 1 g. This was heated in a graphite crucible to 800° C. The amount of hydrogen generated at that time was measured. From the measured amount of hydrogen, the value (mass %) of the hydrogen content (H) was calculated.

The results of Examples 1 to 27 are shown in Table 1 and the results of Comparative Examples 1 to 37 are shown in Table 2. Further, FIG. 1 shows the results of investigation of the relationship between the treatment temperature in the third heat treatment step and the hydrogen content (H) in the case of Examples 1 to 27 of the present invention, Comparative Example 13 of PLT 3, and Comparative Example 37 of PLT 2. As clear from the results shown in Table 1 and Table 2 and in FIG. 1, the carbon support materials of Examples 1 to 27 of the present invention all satisfied the range of "0.004 to 0.010 mass %" of the value of the hydrogen content (H), while among the Comparative Examples 1 to 12 where concentrated sulfuric acid was used for washing treatment, in the case of Comparative Examples 1 and 3 where the temperature of the concentrated sulfuric acid (treatment temperature) was less than 120° C., the case of Comparative Examples 4 to 6 where the treatment temperature at the time of the third heat treatment was 2200° C. and the case of Comparative Examples 7 to 10 where the treatment temperature at the time of the third heat treatment was 900° C. or 800° C., the case of Comparative Examples 13 and 15 to 27 where concentrated nitric acid was used for the washing treatment, the case of Comparative Example 14 where concentrated sulfuric acid was used for the washing treatment, and, furthermore, among the cases where commercially available products were used, cases other than Comparative Example 32 where third heat treatment was performed on the commercially available product of EC600JD at a treatment temperature of 1700° C., the range of "0.004 to 0.010 mass %" of the value of the hydrogen content (H) was not satisfied.

B: Measurement of Nitrogen Adsorption BET Specific Surface Area (S) in Carbon Support Material Each of the carbon support materials of Examples 1 to 27 and Comparative Examples 1 to 37 was measured for its nitrogen adsorption BET specific surface area (S) as follows.

The measurement was performed by measuring about 50 mg of the carbon support material of a sample, drying this at 90° C. in vacuo, measuring the obtained dried sample using an automatic specific surface area measurement apparatus (made by Bel Japan, BELSORP36) by the gas adsorption method using nitrogen gas, and determining the specific surface area by the single-point method based on the BET method.

The results of Examples 1 to 27 are shown in Table 1 and the results of Comparative Examples 1 to 37 are shown in Table 2. Further, FIG. 2 shows the results of investigation of the relationship between the treatment temperature in the third heat treatment step and the nitrogen adsorption BET specific surface area (S) in the case of Examples 1 to 27 of the present invention, the case of Comparative Example 13 of PLT 3, and the case of Comparative Example 37 of PLT 2. As clear from the results shown in Table 1 and Table 2 and in FIG. 2, the carbon support materials of Examples 1 to 27 of the present invention all satisfied the range of "600 to 1500 m$^2$/g" of the value of the nitrogen adsorption BET specific surface area (S), while in the case of Comparative Examples 1 to 3 where the temperature of the concentrated sulfuric acid (treatment temperature) was less than 120° C., in the case of Comparative Examples 5 and 6 where the third heat treatment was performed at a treatment temperature of 2200° C., in the case of Comparative Example 13 where concentrated nitric acid was used for performing washing treatment, in the case of Comparative Examples 32 to 34 where the commercially available product of EC600JD was used for third heat treatment at a treatment temperature of 1700 to 2000° C., and in the case of Comparative Example 35 where the commercially available product of Denka Black FX-35 was used, the range of "600 to 1500 m$^2$/g" of the value of this nitrogen adsorption BET specific surface area (S) was not satisfied.

C: Measurement of Raman Relative Intensity Ratio ($I_D/I_G$) of Carbon Support Material Each of the carbon support materials of Examples 1 to 27 and Comparative Examples 1 to 37 was measured as follows for the Raman relative intensity ratio ($I_D/I_G$). The measurement was performed by measuring about 3 mg of the carbon support material of a sample and using a laser Raman spectrometer (made by JASCO Corporation, NRS-7100) under measurement conditions of an excitation laser: 532 nm, laser power: 100 mW (sample irradiation power: 0.1 mW), microscope arrangement: backscattering, slit: 100 μm×100 μm, object lens: ×100, spot diameter: 1 μm, exposure time: 30 sec, observed wavenumber: 3200 to 750 cm$^{-1}$, cumulative times: 2. From the Raman spectrums obtained in the different measurements, the relative intensity ratio ($I_D/I_G$) of the peak intensity ($I_D$) of the range of 1200 to 1400 cm$^{-1}$ called the "D-band" and the peak intensity ($I_G$) of the range of 1500 to 1700 cm$^{-1}$ called the "G-band" was calculated. The measurement was conducted three times. The average of the three times was used as the measurement data.

The results of Examples 1 to 27 are shown in Table 1 while the results of Comparative Examples 1 to 37 are shown in Table 2. Further, FIG. 3 shows the results of investigation of the relationship between the treatment temperature at the third heat treatment step and the Raman relative intensity ratio ($I_D/I_G$) for the case of Examples 1 to 27 of the present invention and Comparative Example 13 of PLT 3 and Comparative Example 37 of PLT 2. As clear from the results shown in Table 1 and Table 2 and in FIG. 3, the carbon support materials of Examples 1 to 27 of the present invention all have values of the Raman relative intensity ratio ($I_D/I_G$) satisfying the range "1.0 to 2.0", while in the case of Comparative Example 4 where the third heat treatment was performed at a 2200° C. treatment temperature, the case of Comparative Examples 11 and 12 where the sulfuric acid concentration was less than 90 mass %, the case of Comparative Examples 33 and 34 where the commercially available product of EC600JD was used and third heat treatment was performed at a 1800° C. or 2000° C. treatment temperature, and the case of Comparative Example 36 where the commercially available product of YP50F was used, the range "1.0 to 2.0" of the Raman relative intensity ratio ($I_D/I_G$) was not satisfied.

2. Production of Metal Catalyst Particle-Supporting Carbon Material

Each of the carbon support materials of Examples 1 to 27 and Comparative Examples 1 to 37 was dispersed in distilled water. To this dispersion, formaldehyde was added. The mixture was set in a water bath set to 40° C. After the temperature of the dispersion became the same 40° C. as the bath, a dinitrodiamine Pt complex nitric acid aqueous solution was slowly poured into this dispersion while stirring. After that, the mixture was stirred continuously for about 2 hours, then was filtered. The obtained solid was washed. The thus obtained solid was dried at 90° C. in vacuo, then was crushed by a mortar. Next, this was heat treated in a hydrogen atmosphere at 250° C. for 1 hour to thereby prepare a platinum catalyst particle-supporting carbon material of each of Examples 1 to 27 and Comparative Examples 1 to 37. Note that, the supporting ratio of platinum catalyst particles of the platinum catalyst particle-supporting carbon material is adjusted to become 40 mass % of the total mass of the platinum catalyst particles and carbon support material.

D: TEM Observation of Platinum Catalyst Particle-Supporting Carbon Material 1 mg each of the platinum catalyst particle-supporting carbon materials prepared in the above Example 4 ($I_D/I_G$: 1.7) and Comparative Example 34 ($I_D/I_G$: 0.74) was taken and made to disperse in ethanol. The obtained dispersions were dropped on copper mesh grids and made to dry overnight in vacuum. A transmission electron microscope (made by FEI, TECNAI) was used to observe them at an acceleration voltage of 200 kV and observed fields of 2 μm×2 μm. As a representative point, the TEM image of a 0.2 μm×0.2 μm region was captured.

Figure 4:
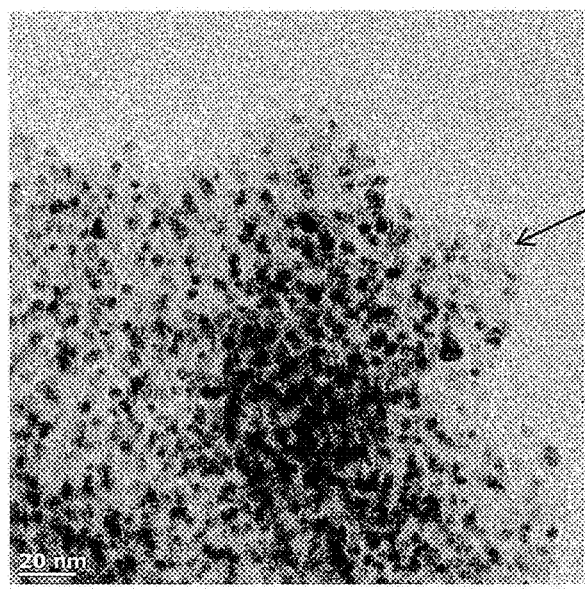
FIG. 4 is a TEM image showing the platinum catalyst particle-supporting carbon material ($I_D/I_G$: 1.7) of Example 4.
Figure 5:
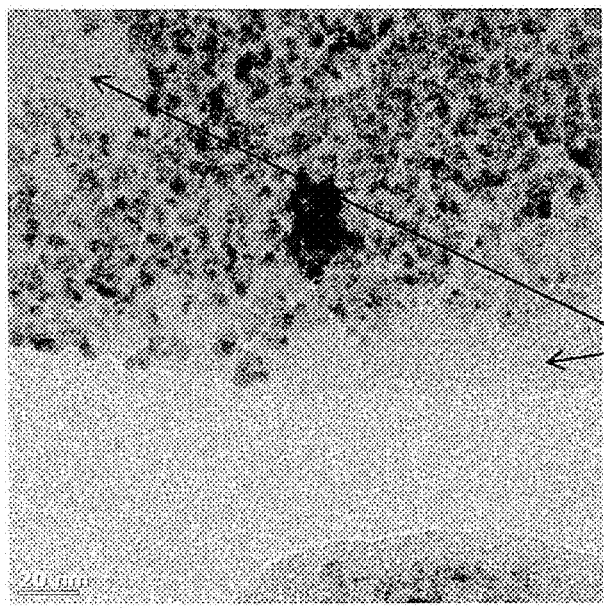
FIG. 5 is a TEM image showing the platinum catalyst particle-supporting carbon material ($I_D/I_G$: 0.74) of Comparative Example 34.

FIG. 4 shows the results of Example 4, while, further, FIG. 5 shows the results of Comparative Example 34. From this, when making a carbon support material with an $I_D/I_G$ of less than 1.0 support platinum catalyst particles (Comparative Example 34), there are few sites where the platinum catalyst particles are affixed. Some regions where no platinum catalyst particles are affixed are seen.

3. Preparation of Catalyst Layer and Membrane Electrode Assembly (MEA)

The platinum catalyst particle-supporting carbon materials of the above Examples 1 to 27 and Comparative Examples 1 to 37 were used. Further an ionomer solution comprised of 5%-Nafion solution (made by Dupont, DE521) was used. In an argon stream, these platinum catalyst particle-supporting carbon materials and 5%-Nafion solution were mixed to give masses of Nafion solids of 1.2 times the masses of the platinum catalyst particle-supporting carbon materials. These were lightly stirred, then ultrasonic waves were used to crush the platinum catalyst particle-supporting carbon materials. To the obtained dispersions, butyl acetate was added under stirring to given total solid concentrations of the platinum catalyst particle-supporting carbon materials and Nafion of 2 mass % and thereby prepare catalyst layer slurries of Examples 1 to 27 and Comparative Examples 1 to 37.

The thus obtained catalyst layer slurries of Examples 1 to 27 and Comparative Examples 1 to 37 were coated on single surfaces of Teflon® sheets by the spray method. The sheets were dried in a 80° C. argon stream for 10 minutes, then in a 120° C. argon stream for 1 hour to obtain solid polymer type fuel cell-use catalyst layers. Note that, these catalyst layers were prepared while setting the spraying and other conditions to give amounts of platinum used of 0.20 mg/cm². Further, the amounts of platinum used were found by measuring the dried weights of the Teflon® sheets before and after spray coating and calculating the difference.

Furthermore, from the obtained solid polymer type fuel cell-use catalyst layers of Examples 1 to 27 and Comparative Examples 1 to 37, two 2.5 cm square size pieces of each electrolytic membrane were cut. Two of the same types of electrodes were used to sandwich the electrolytic membranes (Nafion 112) so that the catalyst layers contacted the electrolytic membranes. These assemblies were hot pressed under conditions of 130° C., 90 kg/cm² for 10 minutes, then were cooled down to room temperature. Next, only the Teflon® sheets were carefully peeled off to make the catalyst layers of the anodes and cathodes bond with the Nafion membranes. Furthermore, from commercially available carbon cloth (made by ElectroChem, EC-CC1-060), two 2.5 cm square size pieces of carbon cloth were cut out. These two pieces of carbon cloth were used to sandwich an anode and cathode fastened to a Nafion membrane. Next, the assembly was hot pressed under conditions of 130° C. and 50 kg/cm² for 10 minutes. The MEAs of Examples 1 to 27 and Comparative Examples 1 to 37 were fabricated in this way.

E: Evaluation of Cell Performance of Metal Catalyst Particle-Supporting Carbon Material The above prepared MEAs of Examples 1 to 27 and Comparative Examples 1 to 37 were assembled into fuel cell unit cells and evaluated for the performance of the fuel cells by the following procedure using a fuel cell measurement device. At this time, the cathode was supplied with air and the anode was supplied with pure hydrogen in amounts giving rates of utilization of 40% and 70% respectively based on the amounts of gas required for generation of 1000 mA/cm² power as 100%. Further, at this time, the gas pressure was made 0.1 MPa, while the cell temperature was made 80° C.

At the time of measurement, first, the supplied air and pure hydrogen were bubbled in distilled water respectively warmed to 80° C. to humidify them, then the gases were supplied to the cell under the above conditions, then the load was gradually increased until 1000 mA/cm². At the point of time of reaching this 1000 mA/cm², the load was fixed. The voltage measured across the cell terminals after the elapse of 60 minutes (cell voltage) was defined as the cell performance of the fuel cell under moistened conditions. The results of Examples 1 to 27 are shown in Table 1, while the results of Comparative Examples 1 to 37 are shown in Table 2.

Examples 28 to 39 and Comparative Examples 38 to 46

Except for using the four types of carbon support materials of Example 4 and Comparative Examples 1, 7, and 15 and performing the following procedure when preparing the platinum catalyst particle-supporting carbon materials, the same procedure was performed as the above example and comparative examples to prepare MEAs. Further, these MEAs were assembled into fuel cell unit cells to evaluate the cell performance.

That is, when preparing the platinum catalyst particle-supporting carbon material, sodium borohydride which has a strong reducing strength as a reducing agent was used, the carbon support material was added to an aqueous solution obtained by dissolving chloroplatinic acid and a chloride of a catalyst metal other than platinum, the mixture was caused to fully disperse by an ultrasonic disperser to prepare a dispersion, an aqueous solution of a large excess of sodium borohydride was poured all at once into this dispersion at 60° C. while stirring, and the chloroplatinic acid and chloride of a catalyst metal other than platinum were reduced to prepare a platinum catalyst particle-supporting carbon material having the supporting rate of metal catalyst particles and composition shown in Table 3. Note that, in Examples 34 to 39 and Comparative Examples 41 to 46, to raise the extent of alloying, the dried catalyst was heat treated under conditions of an inert atmosphere at 800° C. for 5 minutes. Further, at that time, to suppress the coarsening of the particles, the heating was performed as fast as possible. Further, after heat treatment, the catalyst was rapidly cooled. The results are shown in Table 3.

TABLE 1

| Ex. no. | Washing treatment | Third heat treatment: temperature (° C.) | Carbon support material H (mass %) | Carbon support material S ($m^2/g$) | Carbon support material $I_D/I_G$ | Cell voltage (V) |
|---|---|---|---|---|---|---|
| 1 | Hot concentrated sulfuric acid | 1900 | 0.004 | 1078 | 1.68 | 0.669 |
| 2 | Hot concentrated sulfuric acid | 1900 | 0.004 | 1195 | 1.85 | 0.669 |
| 3 | Hot concentrated sulfuric acid | 1900 | 0.004 | 836 | 1.43 | 0.669 |
| 4 | Hot concentrated sulfuric acid | 1800 | 0.004 | 1387 | 1.72 | 0.672 |
| 5 | Hot concentrated sulfuric acid | 1800 | 0.004 | 1119 | 1.83 | 0.665 |
| 6 | Hot concentrated sulfuric acid | 1800 | 0.004 | 825 | 1.44 | 0.663 |
| 7 | Hot concentrated sulfuric acid | 1700 | 0.005 | 1360 | 1.77 | 0.668 |
| 8 | Hot concentrated sulfuric acid | 1700 | 0.005 | 1040 | 1.46 | 0.663 |
| 9 | Hot concentrated sulfuric acid | 1700 | 0.005 | 833 | 1.61 | 0.662 |
| 10 | Hot concentrated sulfuric acid | 1600 | 0.006 | 1358 | 1.96 | 0.668 |
| 11 | Hot concentrated sulfuric acid | 1600 | 0.006 | 1010 | 1.55 | 0.662 |
| 12 | Hot concentrated sulfuric acid | 1600 | 0.006 | 801 | 1.42 | 0.660 |
| 13 | Hot concentrated sulfuric acid | 2100 | 0.004 | 606 | 1.11 | 0.647 |
| 14 | Hot concentrated sulfuric acid | 2100 | 0.004 | 698 | 1.44 | 0.651 |
| 15 | Hot concentrated sulfuric acid | 1800 | 0.004 | 610 | 1.41 | 0.653 |
| 16 | Hot concentrated sulfuric acid | 1700 | 0.005 | 620 | 1.42 | 0.652 |
| 17 | Hot concentrated sulfuric acid | 1600 | 0.006 | 784 | 1.71 | 0.656 |
| 18 | Hot concentrated sulfuric acid | 1500 | 0.007 | 1380 | 1.98 | 0.655 |
| 19 | Hot concentrated sulfuric acid | 1500 | 0.007 | 810 | 1.57 | 0.645 |
| 20 | Hot concentrated sulfuric acid | 1300 | 0.008 | 1362 | 1.57 | 0.649 |
| 21 | Hot concentrated sulfuric acid | 1200 | 0.009 | 806 | 1.41 | 0.648 |
| 22 | Hot concentrated sulfuric acid | 1100 | 0.010 | 1397 | 1.57 | 0.647 |
| 23 | Hot concentrated sulfuric acid | 1000 | 0.010 | 1399 | 1.67 | 0.649 |
| 24 | Hot concentrated sulfuric acid | 1500 | 0.007 | 605 | 1.06 | 0.638 |
| 25 | Hot concentrated sulfuric acid | 1400 | 0.008 | 1415 | 1.73 | 0.645 |
| 26 | Hot concentrated sulfuric acid | 1400 | 0.008 | 793 | 1.94 | 0.642 |
| 27 | Hot concentrated sulfuric acid | 1000 | 0.010 | 1497 | 1.98 | 0.646 |

TABLE 2

| Comp. ex. no. | Washing treatment | Third heat treatment: temperature (° C.) | Carbon support material H (mass %) | Carbon support material S ($m^2/g$) | Carbon support material $I_D/I_G$ | Cell voltage (V) |
|---|---|---|---|---|---|---|
| 1 | Concentrated sulfuric acid | 2000 | 0.003 | 590 | 1.54 | 0.584 |

TABLE 2-continued

| Comp. ex. no. | Washing treatment | Third heat treatment: temperature (° C.) | Carbon support material H (mass %) | S (m²/g) | $I_D/I_G$ | Cell voltage (V) |
|---|---|---|---|---|---|---|
| 2 | Concentrated sulfuric acid | 2000 | 0.004 | 480 | 1.20 | 0.567 |
| 3 | Concentrated sulfuric acid | 2100 | 0.003 | 300 | 1.10 | 0.525 |
| 4 | Hot concentrated sulfuric acid | 2200 | 0.002 | 620 | 0.89 | 0.525 |
| 5 | Hot concentrated sulfuric acid | 2200 | 0.002 | 292 | 1.28 | 0.525 |
| 6 | Hot concentrated sulfuric acid | 2200 | 0.002 | 180 | 1.10 | 0.420 |
| 7 | Hot concentrated sulfuric acid | 900 | 0.012 | 1388 | 1.55 | 0.583 |
| 8 | Hot concentrated sulfuric acid | 900 | 0.012 | 1488 | 1.95 | 0.588 |
| 9 | Hot concentrated sulfuric acid | 800 | 0.015 | 1490 | 1.95 | 0.583 |
| 10 | Hot concentrated sulfuric acid | 800 | 0.015 | 1488 | 1.95 | 0.588 |
| 11 | Hot concentrated sulfuric acid | 1800 | 0.004 | 1322 | 2.25 | 0.630 |
| 12 | Hot concentrated sulfuric acid | 1800 | 0.004 | 1222 | 2.03 | 0.631 |
| 13 | Concentrated nitric acid | 200 | 0.036 | 1501 | 1.72 | 0.595 |
| 14 | Concentrated sulfuric acid | 200 | 0.020 | 1489 | 1.75 | 0.605 |
| 15 | Concentrated nitric acid | 1800 | 0.014 | 613 | 1.36 | 0.533 |
| 16 | Concentrated nitric acid | 1700 | 0.015 | 623 | 1.37 | 0.532 |
| 17 | Concentrated nitric acid | 1600 | 0.016 | 787 | 1.66 | 0.536 |
| 18 | Concentrated nitric acid | 1500 | 0.017 | 1383 | 1.93 | 0.535 |
| 19 | Concentrated nitric acid | 1500 | 0.017 | 813 | 1.52 | 0.525 |
| 20 | Concentrated nitric acid | 1300 | 0.018 | 1365 | 1.52 | 0.529 |
| 21 | ""Concentrated nitric acid | 1200 | 0.019 | 809 | 1.36 | 0.528 |
| 22 | Concentrated nitric acid | 1100 | 0.020 | 1400 | 1.52 | 0.527 |
| 23 | Concentrated nitric acid | 1000 | 0.020 | 1402 | 1.62 | 0.529 |
| 24 | Concentrated nitric acid | 1500 | 0.017 | 608 | 1.01 | 0.538 |
| 25 | Concentrated nitric acid | 1400 | 0.018 | 1418 | 1.68 | 0.545 |
| 26 | Concentrated nitric acid | 1400 | 0.018 | 796 | 1.89 | 0.542 |
| 27 | Concentrated nitric acid | 1000 | 0.020 | 1500 | 1.93 | 0.546 |
| 28 | Commercially available product (EC600JD) | 900 | 0.130 | 1181 | 1.68 | 0.495 |
| 29 | | 1200 | 0.095 | 1050 | 1.60 | 0.501 |
| 30 | | 14 | 0.043 | 798 | 1.69 | 0.451 |
| 31 | | 16 | 0.012 | 610 | 1.56 | 0.455 |
| 32 | | 17 | 0.007 | 499 | 1.20 | 0.421 |
| 33 | | 18 | 0.002 | 387 | 0.76 | 0.411 |
| 34 | | 20 | 0.002 | 303 | 0.74 | 0.401 |
| 35 | Commercially available product (Denka Black FX-35) | | 0.032 | 133 | 1.11 | 0.415 |
| 36 | Commercially available product (YP50F) | | 0.033 | 1460 | 1.21 | 0.495 |
| 37 | Commercially available product (EC600JD) | | 0.192 | 1236 | 1.66 | 0.635 |

TABLE 3

| Ex. no. | Carbon support material | Third heat treatment: temperature (° C.) | Carbon support material H (mass %) | Carbon support material S (m²/g) | Carbon support material $I_D/I_G$ | Metal catalyst particles Supporting rate (mass %) | Metal catalyst particles Composition (at %) | Cell voltage (V) |
|---|---|---|---|---|---|---|---|---|
| 4 | Ex. 4 | 1800 | 0.004 | 1387 | 1.72 | 40 | Pt: 100 | 0.672 |
| 28 | " | 1800 | 0.004 | 1387 | 1.72 | 5 | Pt: 100 | 0.660 |
| 29 | " | 1800 | 0.004 | 1387 | 1.72 | 10 | Pt: 100 | 0.663 |
| 30 | " | 1800 | 0.004 | 1387 | 1.72 | 20 | Pt: 100 | 0.665 |
| 31 | " | 1800 | 0.004 | 1387 | 1.72 | 50 | Pt: 100 | 0.671 |
| 32 | " | 1800 | 0.004 | 1387 | 1.72 | 60 | Pt: 100 | 0.667 |
| 33 | " | 1800 | 0.004 | 1387 | 1.72 | 80 | Pt: 100 | 0.663 |
| 34 | " | 1800 | 0.004 | 1387 | 1.72 | 40 | Pt: 67 Co: 33 | 0.676 |
| 35 | " | 1800 | 0.004 | 1387 | 1.72 | 40 | Pt: 50 Co: 50 | 0.677 |
| 36 | " | 1800 | 0.004 | 1387 | 1.72 | 40 | Pt: 45 Co: 55 | 0.673 |
| 37 | " | 1800 | 0.004 | 1387 | 1.72 | 40 | Pt: 67 Ni: 33 | 0.680 |
| 38 | " | 1800 | 0.004 | 1387 | 1.72 | 40 | Pt: 50 Ni: 50 | 0.682 |
| 39 | " | 1800 | 0.004 | 1387 | 1.72 | 40 | Pt: 45 Ni: 55 | 0.672 |

| Comp. ex. no. | Carbon support material | Third heat treatment: temperature (° C.) | Carbon support material H (mass %) | Carbon support material S (m²/g) | Carbon support material $I_D/I_G$ | Metal catalyst particles Supporting rate (mass %) | Metal catalyst particles Composition (at %) | Cell voltage (V) |
|---|---|---|---|---|---|---|---|---|
| 38 | Comp. Ex. 1 | 2000 | 0.003 | 590 | 1.54 | 40 | Pt: 100 | 0.581 |
| 39 | Comp. Ex. 7 | 900 | 0.012 | 1388 | 1.55 | 40 | Pt: 100 | 0.582 |
| 40 | Comp. Ex. 15 | 1800 | 0.014 | 613 | 1.36 | 40 | Pt: 100 | 0.531 |
| 41 | Comp. Ex. 1 | 2000 | 0.003 | 590 | 1.54 | 40 | Pt: 67 Co: 33 | 0.595 |
| 42 | Comp. Ex. 1 | 2000 | 0.003 | 590 | 1.54 | 40 | Pt: 50 Co: 50 | 0.597 |
| 43 | Comp. Ex. 1 | 2000 | 0.003 | 590 | 1.54 | 40 | Pt: 45 Co: 45 | 0.594 |
| 44 | Comp. Ex. 1 | 2000 | 0.003 | 590 | 1.54 | 40 | Pt: 67 Ni: 33 | 0.593 |
| 45 | Comp. Ex. 1 | 2000 | 0.003 | 590 | 1.54 | 40 | Pt: 50 Ni: 50 | 0.594 |
| 46 | Comp. Ex. 1 | | 0.003 | 590 | 1.54 | 40 | Pt: 45 Ni: 55 | 0.591 |

The invention claimed is:

1. A solid polymer type fuel cell-use carbon support material comprised of a porous carbon material with a hydrogen content of 0.004 mass % to 0.010 mass % in range, a nitrogen adsorption BET specific surface area of 600 m²/g to 1500 m²/g, and a relative intensity ratio ($I_D/I_G$) of a peak intensity ($I_D$) of the range of 1200 to 1400 cm⁻¹ called the "D-band" and a peak intensity ($I_G$) of the range of 1500 to 1700 cm⁻¹ called the "G-band" of 1.0 to 2.0, wherein the peak intensities ($I_D$) and ($I_G$) are obtained from the Raman spectrum.

2. The solid polymer type fuel cell-use carbon support material according to claim 1, wherein said hydrogen content is 0.004 mass % to 0.006 mass % and a relative intensity ratio ($I_D/I_G$) found from the Raman spectrum is 1.4 to 2.0.

3. The solid polymer type fuel cell-use carbon support material according to claim 1 wherein said nitrogen adsorption BET specific surface area is 800 m²/g to 1400 m²/g and a relative intensity ratio ($I_D/I_G$) found from the Raman spectrum is 1.4 to 2.0.

4. The solid polymer type fuel cell-use carbon support material according to claim 1 wherein said hydrogen content is 0.004 mass % to 0.006 mass %, said nitrogen adsorption BET specific surface area is 800 m²/g to 1400 m²/g, and the relative intensity ratio ($I_D/I_G$) found from the Raman spectrum is 1.4 to 2.0.

5. A solid polymer type fuel cell-use metal catalyst particle-supporting carbon material comprised of the solid polymer type fuel cell-use carbon support material according to claim 1 on which metal catalyst particles of Pt alone or mainly Pt are supported.

6. A method of production of a solid polymer type fuel cell-use carbon support material according to claim 1, said method of production of a solid polymer type fuel cell-use carbon support material comprising:

an acetylide forming step of blowing acetylene gas into a solution containing a metal or metal salt and forming a metal acetylide, a first heat treatment step of heating said metal acetylide at 60° C. to 80° C. in temperature and preparing a metal particle-containing intermediate in which metal particles are contained, a second heat treatment step of heating said metal particle-containing intermediate at 160° C. to 200° C. in temperature, causing metal particles to be ejected from said metal particle-containing intermediate, and obtaining a carbon material intermediate, a washing treatment step of bringing the carbon material intermediate obtained at said second heat treatment step into contact with hot concentrated sulfuric acid and cleaning the carbon material intermediate, and a third heat treatment step of heating the carbon material intermediate cleaned at said washing treatment step in a vacuum, in an inert gas atmosphere, or in an air atmosphere to 1000° C. to 2100° C. in temperature to obtain a carbon support material.

7. A method of production of a solid polymer type fuel cell-use metal catalyst particle-supporting carbon material comprising causing a carbon support material comprised of a porous carbon material with a hydrogen content of 0.004 mass % to 0.010 mass % in range, a nitrogen adsorption BET specific surface area of 600 m$^2$/g to 1500 m$^2$/g, and a relative intensity ratio ($I_D/I_G$) of a peak intensity ($I_D$) of the range of 1200 to 1400 cm$^{-1}$ called the "D-band" and a peak intensity ($I_G$) of the range of 1500 to 1700 cm$^{-1}$ called the "G-band" of 1.0 to 2.0, wherein the peak intensities ($I_D$) and ($I_G$) are obtained from the Raman spectrum obtained by the method according to said claim 6 to be dispersed into a liquid dispersion medium, adding to the obtained dispersion a complex or salt of a metal mainly comprised of platinum and a reducing agent, reducing the metal ions in a liquid phase to cause the precipitation of fine metal catalyst particles mainly comprised of platinum, and supporting the precipitated metal catalyst particles on said carbon support material to thereby produce a solid polymer type fuel cell-use metal catalyst particle-supporting carbon material on which metal catalyst particles of Pt alone or mainly Pt are supported.

8. A solid polymer type fuel cell-use metal catalyst particle-supporting carbon material comprised of the solid polymer type fuel cell-use carbon support material according to claim 2 on which metal catalyst particles of Pt alone or mainly Pt are supported.

9. A solid polymer type fuel cell-use metal catalyst particle-supporting carbon material comprised of the solid polymer type fuel cell-use carbon support material according to claim 3 on which metal catalyst particles of Pt alone or mainly Pt are supported.

10. A solid polymer type fuel cell-use metal catalyst particle-supporting carbon material comprised of the solid polymer type fuel cell-use carbon support material according to claim 4 on which metal catalyst particles of Pt alone or mainly Pt are supported.

11. A method of production of a solid polymer type fuel cell-use carbon support material according to claim 2, said method of production of a solid polymer type fuel cell-use carbon support material comprising:

an acetylide forming step of blowing acetylene gas into a solution containing a metal or metal salt and forming a metal acetylide, a first heat treatment step of heating said metal acetylide at 60° C. to 80° C. in temperature and preparing a metal particle-containing intermediate in which metal particles are contained, a second heat treatment step of heating said metal particle-containing intermediate at 160° C. to 200° C. in temperature, causing metal particles to be ejected from said metal particle-containing intermediate, and obtaining a carbon material intermediate, a washing treatment step of bringing the carbon material intermediate obtained at said second heat treatment step into contact with hot concentrated sulfuric acid and cleaning the carbon material intermediate, and a third heat treatment step of heating the carbon material intermediate cleaned at said washing treatment step in a vacuum, in an inert gas atmosphere, or in an air atmosphere to 1000° C. to 2100° C. in temperature to obtain a carbon support material.

12. A method of production of a solid polymer type fuel cell-use carbon support material according to claim 3, said method of production of a solid polymer type fuel cell-use carbon support material comprising:

an acetylide forming step of blowing acetylene gas into a solution containing a metal or metal salt and forming a metal acetylide, a first heat treatment step of heating said metal acetylide at 60° C. to 80° C. in temperature and preparing a metal particle-containing intermediate in which metal particles are contained, a second heat treatment step of heating said metal particle-containing intermediate at 160° C. to 200° C. in temperature, causing metal particles to be ejected from said metal particle-containing intermediate, and obtaining a carbon material intermediate, a washing treatment step of bringing the carbon material intermediate obtained at said second heat treatment step into contact with hot concentrated sulfuric acid and cleaning the carbon material intermediate, and a third heat treatment step of heating the carbon material intermediate cleaned at said washing treatment step in a vacuum, in an inert gas atmosphere, or in an air atmosphere to 1000° C. to 2100° C. in temperature to obtain a carbon support material.

13. A method of production of a solid polymer type fuel cell-use carbon support material according to claim 4, said method of production of a solid polymer type fuel cell-use carbon support material comprising:

an acetylide forming step of blowing acetylene gas into a solution containing a metal or metal salt and forming a metal acetylide, a first heat treatment step of heating said metal acetylide at 60° C. to 80° C. in temperature and preparing a metal particle-containing intermediate in which metal particles are contained, a second heat treatment step of heating said metal particle-containing intermediate at 160° C. to 200° C. in temperature, causing metal particles to be ejected from said metal particle-containing intermediate, and obtaining a carbon material intermediate, a washing treatment step of bringing the carbon material intermediate obtained at said second heat treatment step into contact with hot concentrated sulfuric acid and cleaning the carbon material intermediate, and a third heat treatment step of heating the carbon material intermediate cleaned at said washing treatment step in a vacuum, in an inert gas atmosphere, or in an air atmosphere at 1000° C. to 2100° C. in temperature to obtain a carbon support material.

\* \* \* \* \*